US012604023B2

(12) United States Patent
Lin et al.

(10) Patent No.: US 12,604,023 B2
(45) Date of Patent: Apr. 14, 2026

(54) METHOD FOR PERFORMING IMAGE DECOMPRESSION WITH LIMITED HARDWARE RESOURCE, ASSOCIATED IMAGE PROCESSING CIRCUIT AND ASSOCIATED ELECTRONIC DEVICE

(71) Applicant: Realtek Semiconductor Corp., HsinChu (TW)

(72) Inventors: Chang-Shing Lin, HsinChu (TW); Feihu Wang, Suzhou City (CN); Yifan Zhang, Suzhou City (CN); Hao Wang, Suzhou City (CN)

(73) Assignee: Realtek Semiconductor Corp., HsinChu (TW)

( * ) Notice: Subject to any disclaimer, the term of this patent is extended or adjusted under 35 U.S.C. 154(b) by 1 day.

(21) Appl. No.: 18/890,728

(22) Filed: Sep. 19, 2024

(65) Prior Publication Data

US 2025/0337935 A1 Oct. 30, 2025

(30) Foreign Application Priority Data

Apr. 29, 2024 (CN) ......................... 202410532436.9

(51) Int. Cl.
*H01L 29/94* (2006.01)
*H04N 19/124* (2014.01)
(Continued)

(52) U.S. Cl.
CPC ........... *H04N 19/44* (2014.11); *H04N 19/124* (2014.11); *H04N 19/30* (2014.11); *H04N 19/423* (2014.11)

(58) Field of Classification Search
CPC ...... H04N 19/44; H04N 19/124; H04N 19/30; H04N 19/423; H04N 19/42; H04N 19/90
See application file for complete search history.

(56) References Cited

U.S. PATENT DOCUMENTS 6,104,751 A 8/2000 Artieri
10,984,560 B1* 4/2021 Appalaraju ............ G06V 10/82
(Continued)

FOREIGN PATENT DOCUMENTS

CN 1893666 B 6/2011
CN 115358954 A 11/2022
(Continued)

OTHER PUBLICATIONS

S. E. Tsai, et al., "A Fast DCT Algorithm for Watermarking in Digital Signal Processor", Mathematical Problems in Engineering, vol. 2017, Article ID 7401845, https://doi.org/10.1155/2017/7401845 ,Feb. 9, 2017.
(Continued)

*Primary Examiner* — Joseph Suh
(74) *Attorney, Agent, or Firm* — Winston Hsu

(57) ABSTRACT

A method for performing image decompression with limited hardware resource, associated image processing circuit and electronic device are provided. The method may include: utilizing an inverse quantization circuit to perform inverse quantization processing according to a bitstream to generate a first processing result, where the bitstream carries compressed data of a predetermined image; and utilizing an up-sampling circuit to perform up-sampling processing on the first processing result to generate a second processing result, for generating a decompressed image as a reproduced version of the predetermined image. During generating the decompressed image according to the bitstream, the image processing circuit is arranged to prevent using any entropy decoding circuit, any quantization table, any de-zigzag circuit, and any inverse transform circuit associated with the aforementioned any entropy decoding circuit, the aforementioned any quantization table and the aforementioned any de-zigzag circuit.

8 Claims, 10 Drawing Sheets

(51) Int. Cl.
    *H04N 19/30*         (2014.01)
    *H04N 19/423*      (2014.01)
    *H04N 19/44*        (2014.01)

(56)                 References Cited

U.S. PATENT DOCUMENTS

| | | | |
|---|---|---|---|
| 11,509,902 B2 * | 11/2022 | Ferrara | H04N 19/186 |
| 2003/0108099 A1 * | 6/2003 | Nagumo | G06T 9/20 |
| | | | 375/E7.199 |
| 2005/0053294 A1 * | 3/2005 | Mukerjee | H04N 19/51 |
| | | | 375/E7.125 |
| 2006/0126962 A1 * | 6/2006 | Sun | H04N 19/895 |
| | | | 382/268 |
| 2010/0246983 A1 * | 9/2010 | Hosokawa | H03M 7/3088 |
| | | | 382/232 |
| 2015/0023416 A1 * | 1/2015 | Tanaka | H04N 19/50 |
| | | | 375/240.08 |
| 2016/0286155 A1 * | 9/2016 | Bhuvanagiri | H04N 23/63 |
| 2016/0360213 A1 * | 12/2016 | Lee | H04N 19/124 |
| 2017/0070735 A1 * | 3/2017 | Ramasubramonian | |
| | | | H04N 19/124 |
| 2017/0085878 A1 * | 3/2017 | Sole Rojals | H04N 19/44 |

| | | | |
|---|---|---|---|
| 2017/0359596 A1 * | 12/2017 | Kim | H04N 19/132 |
| 2020/0228148 A1 * | 7/2020 | Thomas | H03M 7/6023 |
| 2020/0413049 A1 * | 12/2020 | Biatek | H04N 19/11 |
| 2021/0266590 A1 * | 8/2021 | Abe | H04N 19/105 |
| 2023/0401346 A1 * | 12/2023 | Presley | G06F 30/12 |

FOREIGN PATENT DOCUMENTS

| | | | | |
|---|---|---|---|---|
| JP | 7-184214 | A | 7/1995 | |
| JP | 2004-120785 | A | 4/2004 | |
| JP | 2017-158183 | A | 9/2017 | |
| JP | 2019-140477 | A | 8/2019 | |
| JP | 2020-127178 | A | 8/2020 | |
| JP | 2024-508216 | A | 2/2024 | |
| KR | 10-0696451 | B1 | 3/2007 | |
| KR | 102608822 | B1 * | 12/2023 | H04N 9/64 |

OTHER PUBLICATIONS

Borko Furht, "Image Presentation and Compression", https://www.researchgate.net/publication/229038449_IMAGE_PRESENTATION_AND_COMPRESSION , Jan. 1999.

* cited by examiner (a)

(b)

(c)

1

METHOD FOR PERFORMING IMAGE DECOMPRESSION WITH LIMITED HARDWARE RESOURCE, ASSOCIATED IMAGE PROCESSING CIRCUIT AND ASSOCIATED ELECTRONIC DEVICE

BACKGROUND OF THE INVENTION

1. Field of the Invention

The present invention is related to image processing, and more particularly, to a method for performing image decompression with limited hardware resource, an associated image processing circuit and an associated electronic device.

2. Description of the Prior Art

For image compression, most proposals in the related art focus on the compression rate and compression quality of the image, but this is easily accompanied by problems such as high hardware cost, complex design, and poor performance. For example, an image decoder 10 as shown in FIG. 1 comprises an entropy decoding circuit 11, a quantization table 12, an inverse quantization circuit 13, a de-zigzag circuit 15 and an inverse transform circuit 17, and the complex architecture thereof can easily cause the above problems. In addition, there seems to be no proper technical solution in the related art for reducing the associated costs.

SUMMARY OF THE INVENTION

It is an objective of the present invention to provide a method for performing image decompression with limited hardware resource, an associated image processing circuit and an associated electronic device, in order to solve the above-mentioned problems.

At least one embodiment of the present invention provides a method for performing image decompression with limited hardware resource, where the method is applicable to an image processing circuit, and the method may comprise: utilizing an inverse quantization circuit within the image processing circuit to perform inverse quantization processing according to a bitstream to generate a first processing result, wherein the bitstream carries compressed data of a predetermined image; and utilizing an up-sampling circuit within the image processing circuit to perform up-sampling processing on the first processing result to generate a second processing result, for generating a decompressed image as a reproduced version of the predetermined image; wherein during generating the decompressed image according to the bitstream, the image processing circuit is arranged to prevent using any entropy decoding circuit, any quantization table, any de-zigzag circuit, and any inverse transform circuit associated with the aforementioned any entropy decoding circuit, the aforementioned any quantization table and the aforementioned any de-zigzag circuit.

At least one embodiment of the present invention provides an image processing circuit, for performing image decompression with limited hardware resource. The image processing circuit may comprise an inverse quantization circuit and an up-sampling circuit coupled to the inverse quantization circuit. For example, the inverse quantization circuit may be arranged to perform inverse quantization processing according to a bitstream to generate a first processing result, wherein the bitstream carries compressed data of a predetermined image; and the up-sampling circuit may be arranged to perform up-sampling processing on the first processing result to generate a second processing result, for generating a decompressed image as a reproduced version of the predetermined image; wherein during generating the decompressed image according to the bitstream, the image processing circuit is arranged to prevent using any entropy decoding circuit, any quantization table, any de-zigzag circuit, and any inverse transform circuit associated with the aforementioned any entropy decoding circuit, the aforementioned any quantization table and the aforementioned any de-zigzag circuit.

At least one embodiment of the present invention provides an electronic device which comprises the image processing circuit mentioned above, wherein the electronic device further comprises a processing circuit and a storage device coupled to the processing circuit. The processing circuit may be arranged to control operations of the electronic device; and the storage device may be arranged to store information for the electronic device, wherein the information comprises the compressed data. In addition, the processing circuit may be arranged to generate the decompressed image according to the bitstream, for being displayed on a display of the electronic device.

It is an advantage of the present invention that, through proper design, the method, the associated image processing circuit and the associated electronic device of the present invention can operate normally in a situation where the aforementioned any entropy decoding circuit, the aforementioned any quantization table, the aforementioned any de-zigzag circuit and the aforementioned any inverse transform circuit do not exist, and the compression/decompression can work very well, especially for icons. For example, under an economical budget, products operating according to the method of the present invention can achieve optimized performance. In addition, when implementing according to the present invention, the associated costs are low, the compression algorithm is simple, there is no usage restriction, and there is no dependency between data, so it is very suitable for using multiple pieces of hardware for parallel processing to achieve the purpose of acceleration.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
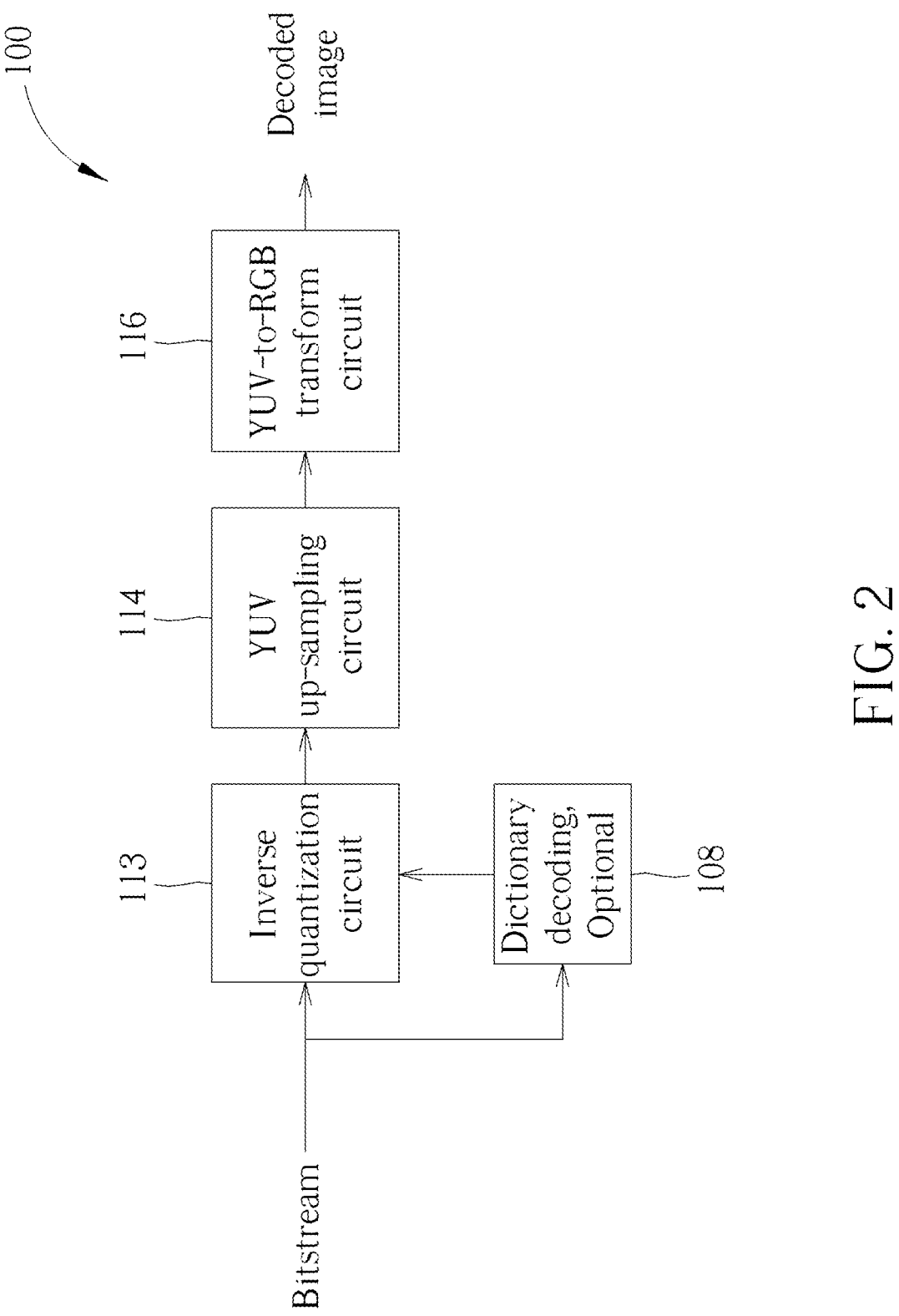
FIG. 2 is a diagram of an image processing circuit according to an embodiment of the present invention, where the image processing circuit operates based on a method for performing image decompression with limited hardware resource in the present invention.

FIG. 2 is a diagram of an image processing circuit 100 according to an embodiment of the present invention, where the image processing circuit 10 may be installed in an electronic device and may operate based on a method for performing image decompression with limited hardware resource in the present invention. The image processing circuit 100 may comprise an inverse quantization circuit 113, an up-sampling circuit 114 and a transform circuit 116, and may comprise a dictionary decoding circuit 108 such as the optional decoding circuit 108 (labeled "Dictionary decoding, Optional" for brevity), for being selectively enabled. In this embodiment, the up-sampling circuit 114 and the transform circuit 116 may be implemented as the YUV up-sampling circuit 114 and the YUV-to-RGB transform circuit 116, respectively. According to some embodiments, the up-sampling circuit 114 such as the YUV up-sampling circuit 114, the transform circuit 116 such as the YUV-to-RGB transform circuit 116, and/or the associated color space may vary.

For example, the inverse quantization circuit 113 may be arranged to perform inverse quantization processing according to a bitstream to generate a first processing result, where the bitstream carries compressed data of a predetermined image. The YUV up-sampling circuit 114 may perform up-sampling processing on the first processing result to generate a second processing result, for generating a decompressed image as a reproduced version of the predetermined image. More particularly, the YUV-to-RGB transform circuit 116 may perform image format transform on the second processing result to generate a third processing result, for generating the decompressed image. Regarding the compressed data that is pre-generated, the image processing circuit 100 may selectively enable the dictionary decoding circuit 108 according to the control of an upper layer circuit (e.g., a processor) in the electronic device. If the compressed data has been heavily compressed, in particular, processed with dictionary encoding, the image processing circuit 100 may enable the dictionary decoding circuit 108. In this situation, the dictionary decoding circuit 108 may perform dictionary decoding on the bitstream to generate a preliminary processing result, and the inverse quantization circuit 113 may perform the inverse quantization processing on the preliminary processing result to generate the first processing result.

During generating the decompressed image according to the bitstream, the image processing circuit 100 can prevent using any entropy decoding circuit, any quantization table, any de-zigzag circuit, and any inverse transform circuit associated with the aforementioned any entropy decoding circuit, the aforementioned any quantization table and the aforementioned any de-zigzag circuit. More particularly, in the image processing circuit 100, the aforementioned any entropy decoding circuit such as the entropy decoding circuit 11, the aforementioned any quantization table such as the quantization table 12, the aforementioned any de-zigzag circuit such as the de-zigzag circuit 15 and the aforementioned any inverse transform circuit such as the inverse transform circuit 17 do not exist. In addition, the dictionary decoding circuit 108, the YUV up-sampling circuit 114 and the YUV-to-RGB transform circuit 116 are all small modules/circuits with low cost and high performance. Therefore, the image processing circuit 100 (which may be regarded as an image decompression circuit) can perform image decompression with the extremely limited hardware resource thereof. For example, the predetermined image may represent a predetermined icon image. In some examples, the predetermined image may represent any other image.

Figure 3:
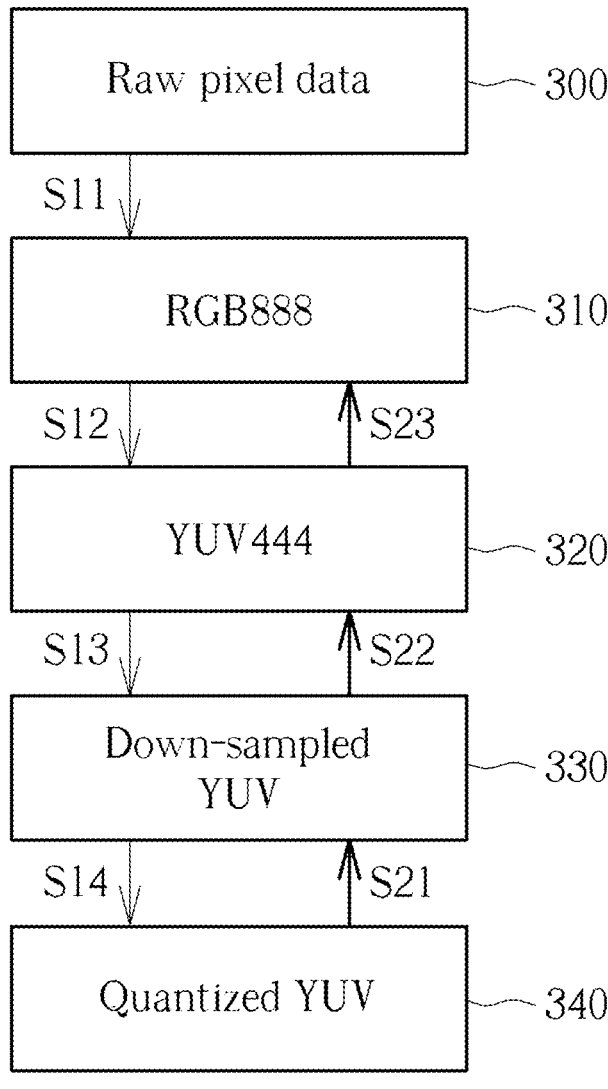
FIG. 3 is a diagram illustrating a compression procedure and a decompression procedure of the method according to an embodiment of the present invention.

FIG. 3 is a diagram illustrating a compression procedure and a decompression procedure of the method according to an embodiment of the present invention. The compression procedure may comprise Steps S11 to S14, and the decompression procedure may comprise Steps S21 to S23. An image compression circuit corresponding to the image decompression circuit (or the image processing circuit 100) may be arranged to execute the compression procedure, and the image decompression circuit (or the image processing circuit 100) may be arranged to execute the decompression procedure. For example, the image compression circuit may be implemented by way of a computer (or a processor therein) running an image compression software module. For better comprehension, the associated data may comprise:

(1) raw data, such as raw pixel data 300, which may be expressed with pixel data of color channels such as red (R), green (G) and blue (B), having a first format, wherein the first format may represent any format among multiple formats such as 16 bits per pixel, 24 bits per pixel, 32 bits per pixel, etc.;

(2) multiple sets of non-compressed pixel data, such as multiple sets of RGB data 310, having a second format, for example, the RGB888 format with 24 bits per pixel and 8 bits each for the above-mentioned R, G and B channels (labeled "RGB888" for brevity);

(3) multiple sets of luminance and chrominance data, such as multiple sets of YUV data 320, having a third format, for example, the YUV444 format (labeled "YUV444" for brevity);

(4) multiple sets of down-sampled luminance and chrominance data, such as multiple sets of down-sampled YUV data 330 (labeled "Down-sampled YUV" for brevity); and (5) multiple sets of quantized down-sampled luminance and chrominance data in the compressed data (i.e., the quantized luminance and chrominance data obtained by quantizing the "down-sampled luminance and chrominance data"), such as multiple sets of quantized YUV data 340 (labeled "Quantized YUV" for brevity);

where the luminance and the chrominance in the color space (Y, U, V) may be expressed as the luminance Y and the chrominance (U, V), respectively. Taking the above data 300, 310, 320, 330 and 340 as an example, performing the inverse quantization processing may comprise performing de-quantization on the data 340 to generate the data 330. The first processing result may comprise the data 330 corresponding to the data 340, the second processing result may comprise data the 320 corresponding to the data 330, and the third processing result may comprise the data 310 corresponding to the data 320. According to some embodiments, the color channels, the bit count per pixel, the image format, and/or the associated color space may vary. Additionally, the compression procedure and the decompression procedure are inverse procedures of each other, and the respective processing of the compression procedure and the decompression procedure at the same layer may be regarded as inverse processing of each other.

The image compression circuit may convert the raw pixel data 300 into the data 310 of the RGB888 format in Step S11, convert the data 310 of the RGB888 format into the data 320 of the YUV444 format in Step S12, perform down-sampling processing on the data 320 of the YUV444 format in Step S13 to convert the data 320 of the YUV444 format into the down-sampled YUV data 330 such as the data 330 of the YUV422 format or the YUV411 format, and perform quantization processing on the down-sampled YUV data 330 in Step S14 to convert the down-sampled YUV data 330 into the quantized YUV data 340, in order to complete the image compression, where the image compression circuit may selectively determine the quantization degree of different YUV planes in Step S14. In addition, the image decompression circuit (or the image processing circuit 100) may perform de-quantization processing on the quantized YUV data 340 in Step S21 to convert the quantized YUV data 340 into the down-sampled YUV data 330 such as the data 330 of the YUV422 format or the YUV411 format, perform up-sampling processing on the down-sampled YUV data 330 in Step S22 to convert the down-sampled YUV data 330 into the data 320 of the YUV444 format, and convert the data 320 of the YUV444 format into the data 310 of the RGB888 format in Step S23, in order to complete the image decompression.

For example, the RGB-to-YUV transform may be expressed with the following equations:

$$Y = 0.299 * R + 0.587 * G + 0.144 * B;$$

$$U = -0.169 * R - 0.331 * G + 0.5 * B + 128; \text{ and}$$

$$V = 0.5 * R - 0.419 * G - 0.081 * B + 128;$$

where the data 310 and 320 may be expressed as the data (R, G, B) of the RGB888 format and the data (Y, U, V) of the YUV444 format, respectively. The image compression circuit may use the above equations of the RGB-to-YUV transform to convert the data (R, G, B) of the RGB888 format into the data (Y, U, V) of the YUV444 format in Step S12, perform down-sampling processing on the data (Y, U, V) of the YUV444 format in Step S13 to convert the data (Y, U, V) of the YUV444 format, such as the original four pixels {[Y0, U0, V0], [Y1, U1, V1], [Y2, U2, V2], [Y3, U3, V3]}, into the down-sampled YUV data 330 such as the bitstream {Y0, U0, Y1, V1, Y2, U2, Y3, V3} arranged in the YUV422 format, and perform quantization on the bitstream {Y0, U0, Y1, V1, Y2, U2, Y3, V3} in Step S14, for example, shift two bits for all three planes of YUV, as shown in FIG. 4A and FIG. 4B.

Figure 4A:
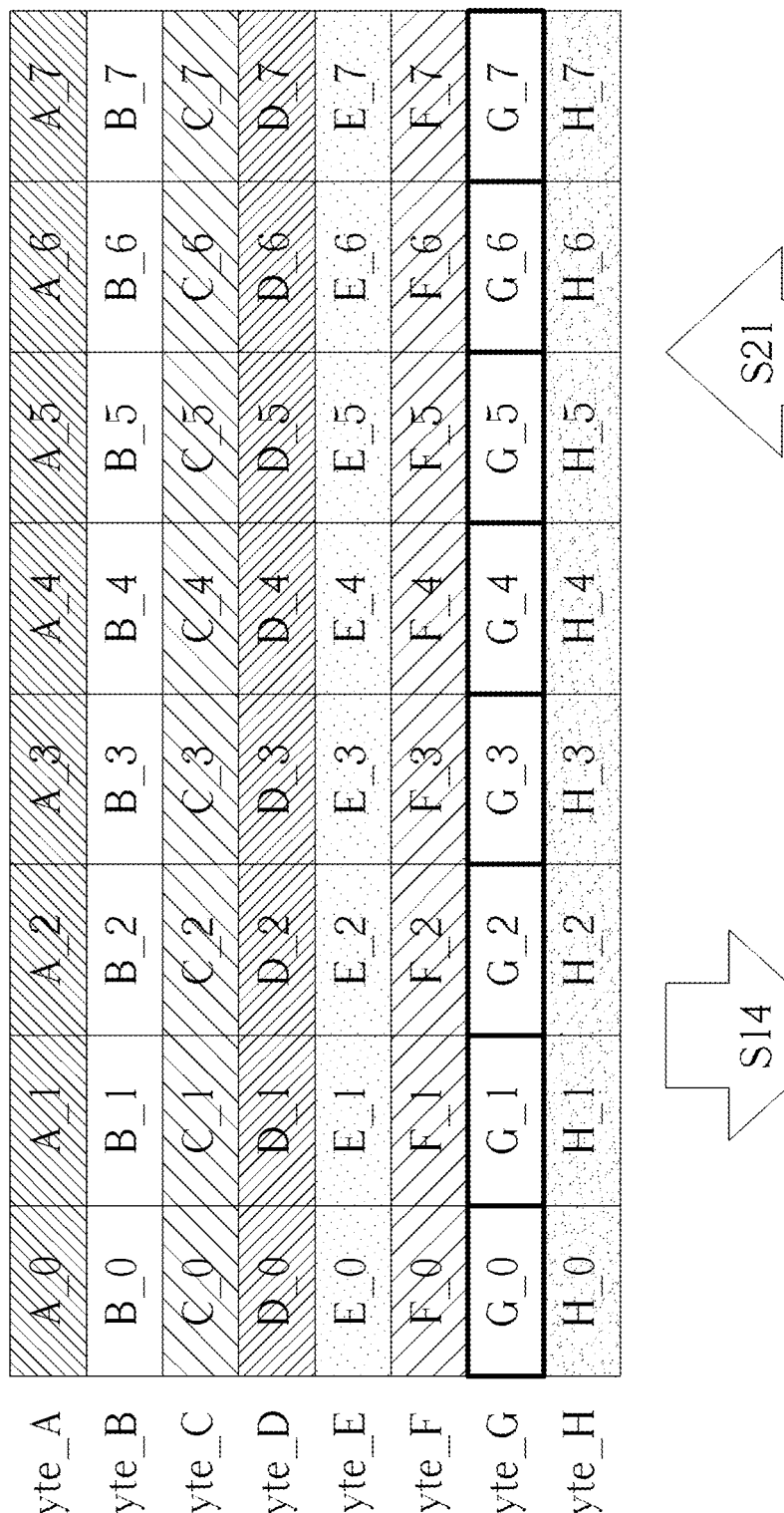
FIG. 4A illustrates some implementation details of the compression procedure and the decompression procedure shown in FIG. 3 according to an embodiment of the present invention.
Figure 4B:
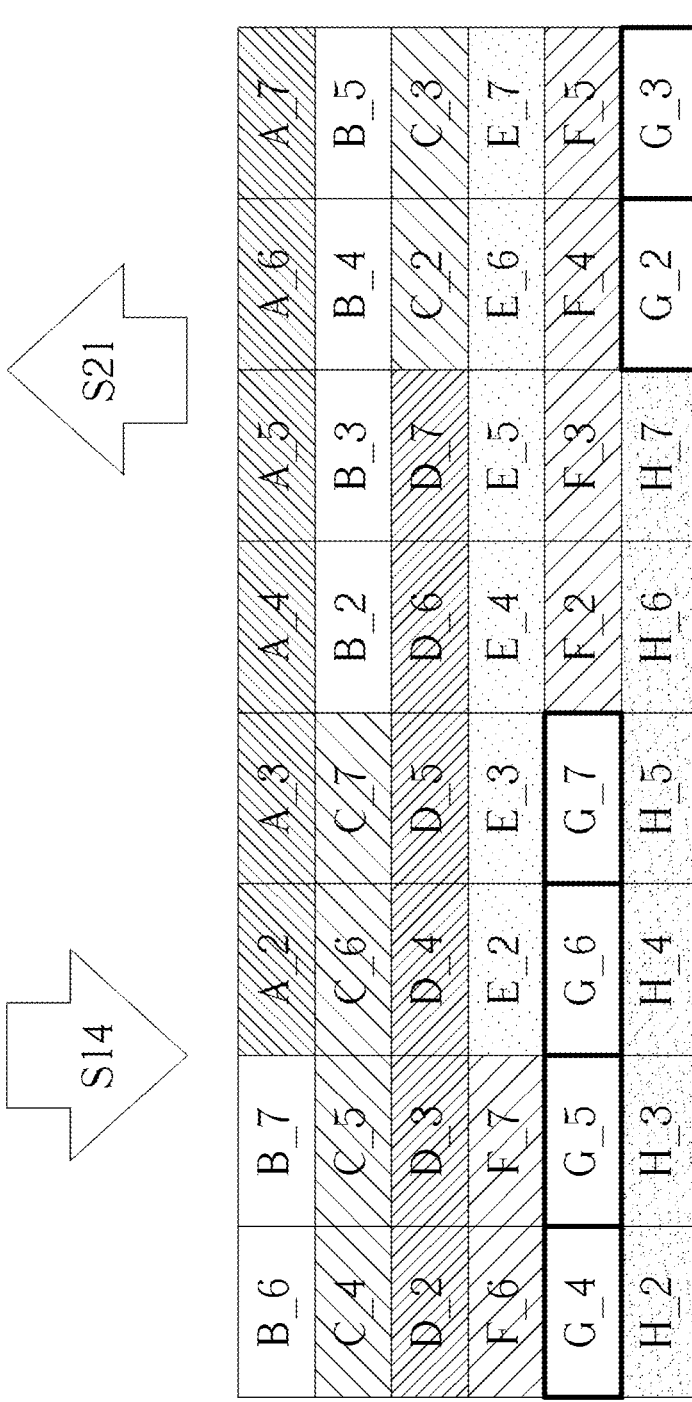
FIG. 4B illustrates some other implementation details of the compression procedure and the decompression procedure shown in FIG. 3 according to the embodiment shown in FIG. 4A

FIG. 4A and FIG. 4B respectively illustrate some implementation details of the compression procedure and the decompression procedure shown in FIG. 3 according to an embodiment of the present invention. As shown in FIG. 4A, a set of down-sampled YUV data among the multiple sets of down-sampled YUV data 330 may comprise the bytes {Byte_A, Byte_B, Byte_C, Byte_D, Byte_E, Byte_F, Byte_G, Byte_H}, which may comprise the bits {A_0, . . . , A_7}, {B_0, . . . , B_7}, {C_0, . . . , C_7}, {D_0, . . . , D_7}, {E_0, . . . , E_7}, {F_0, . . . , F_7}, {G_0, . . . , G_7} and {H_0, . . . , H_7}, respectively. As shown in FIG. 4B, a set of quantized YUV data among the multiple sets of quantized YUV data 340 may comprise respective partial bits of the bytes {Byte_A, Byte_B, Byte_C, Byte_D, Byte_E, Byte_F, Byte_G, Byte_H}, such as most bits {A_2, . . . , A_7}, {B_2, . . . , B_7}, {C_2, . . . , C_7}, {D_2, . . . , D_7}, {E_2, . . . , E_7}, {F_2, . . . , F_7}, {G_2, . . . , G_7} and {H_2, . . . , H_7} starting from their respective most significant bits (MSBs), respectively.

TABLE 1A

| | Sample type YUV 444 Quantize bit | | | |
|---|---|---|---|---|
| Raw data | 0 | 1 | 2 | 4 |
| 24 bits, e.g., RGB888 | 100.0% | 87.5% | 75.0% | 50.0% |

TABLE 1B

| | Sample type YUV 422 Quantize bit | | | |
|---|---|---|---|---|
| Raw data | 0 | 1 | 2 | 4 |
| 24 bits, e.g., RGB888 | 66.7% | 58.3% | 50.0% | 33.3% |

TABLE 1C

| | Sample type YUV 411 Quantize bit | | | |
|---|---|---|---|---|
| Raw data | 0 | 1 | 2 | 4 |
| 24 bits, e.g., RGB888 | 50.0% | 43.8% | 37.5% | 25.0% |

Table 1A, Table 1B and Table 1C illustrate the theoretical compression rates regarding the raw data with 24 bits per pixel (such as that of the RGB888 format) under different configurations (e.g., various sample types and various quantize bit counts such as quantization-removed bit counts).

TABLE 2A

| | Sample type YUV 444 Quantize bit | | | |
|---|---|---|---|---|
| Raw data | 0 | 1 | 2 | 4 |
| 16 bits, e.g., RGB565 | 150.0% | 131.3% | 112.5% | 75.0% |
| 24 bits, e.g., RGB888 | 100.0% | 87.5% | 75.0% | 50.0% |
| 32 bits, e.g., ARGB8888 | 75.0% | 65.6% | 56.3% | 37.5% |

TABLE 2B

| | Sample type YUV 422 Quantize bit | | | |
|---|---|---|---|---|
| Raw data | 0 | 1 | 2 | 4 |
| 16 bits, e.g., RGB565 | 100.0% | 87.5% | 75.0% | 50.0% |
| 24 bits, e.g., RGB888 | 66.7% | 58.3% | 50.0% | 33.3% |
| 32 bits, e.g., ARGB8888 | 50.0% | 43.8% | 37.5% | 25.0% |

TABLE 2C

| | Sample type YUV 411 Quantize bit | | | |
|---|---|---|---|---|
| Raw data | 0 | 1 | 2 | 4 |
| 16 bits, e.g., RGB565 | 75.0% | 65.6% | 56.3% | 37.5% |
| 24 bits, e.g., RGB888 | 50.0% | 43.8% | 37.5% | 25.0% |
| 32 bits, e.g., ARGB8888 | 37.5% | 32.8% | 28.1% | 18.8% |

Table 2A, Table 2B and Table 2C illustrate the theoretical compression rates regarding the raw data with 16 bits per pixel (such as that of the RGB565 format), the raw data with 24 bits per pixel (such as that of the RGB888 format) and the raw data with 32 bits per pixel (such as that of the ARGB8888 format) under the aforementioned different configurations.

Figure 5:
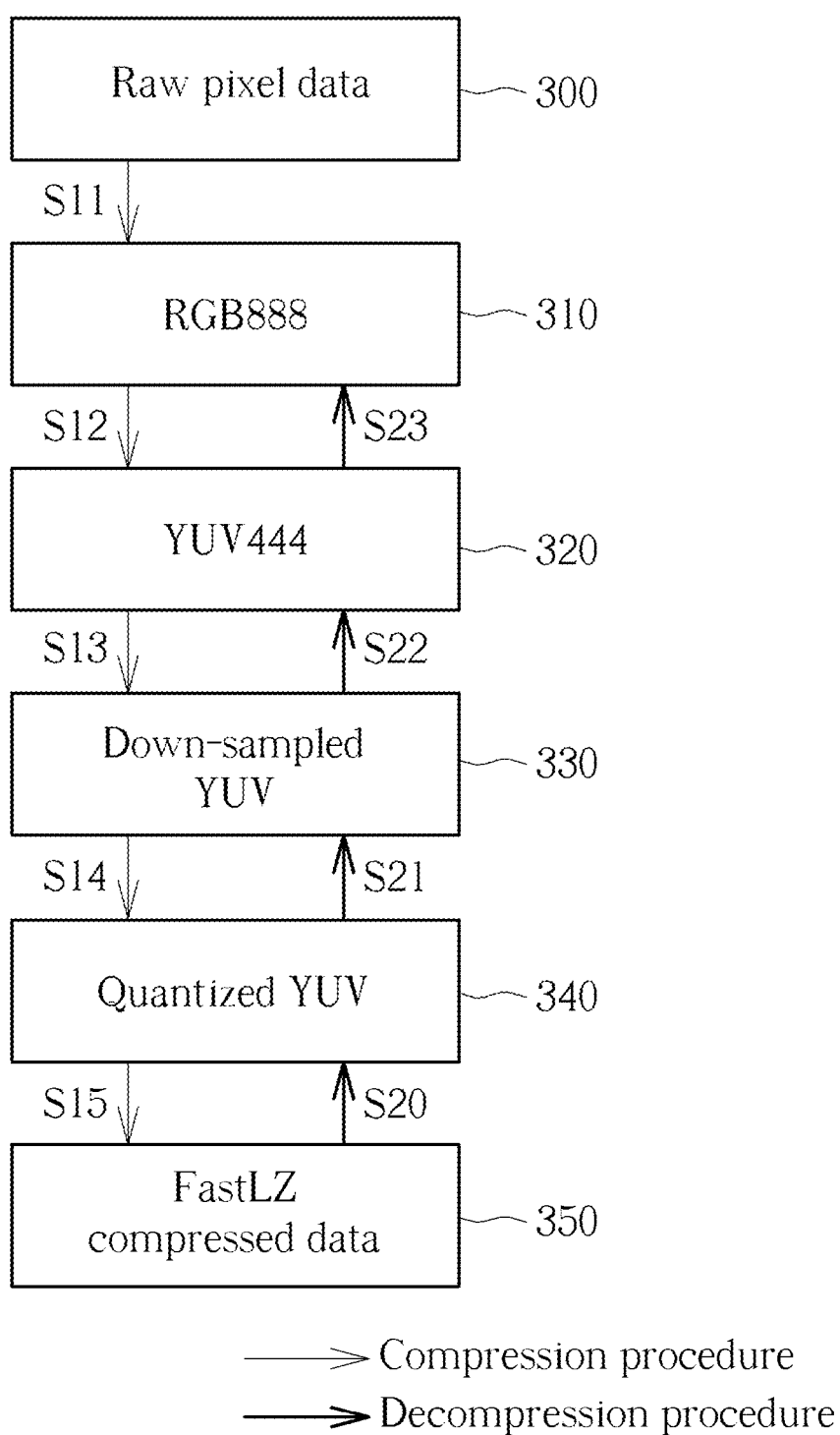
FIG. 5 is a diagram illustrating a compression procedure and a decompression procedure of the method according to another embodiment of the present invention.

FIG. 5 is a diagram illustrating a compression procedure and a decompression procedure of the method according to another embodiment of the present invention. The compression procedure may comprise Steps S11 to S15, and the decompression procedure may comprise Steps S20 to S23. The image compression circuit may be arranged to execute the compression procedure, and the image decompression circuit (or the image processing circuit 100) may be arranged to execute the decompression procedure. In addition, the image compression circuit and the image decompression circuit (or the image processing circuit 100) may perform distortion-free dictionary encoding and dictionary decoding according to the FastLZ algorithm, respectively, where the FastLZ algorithm may be regarded as ANSI C/C90 implementation of the Lempel-Ziv 77 (LZ77) algorithm of lossless data compression. For example, the image compression circuit may further compress the quantized YUV data 340 in Step S15 to convert the quantized YUV data 340 into the FastLZ compressed data 350, in order to complete the image compression. In another example, the image decompression circuit (or the image processing circuit 100) may decompress the FastLZ compressed data 350 in Step S20 to convert the FastLZ compressed data 350 into the quantized YUV data 340. For brevity, similar descriptions for this embodiment are not repeated in detail here.

Figure 1:
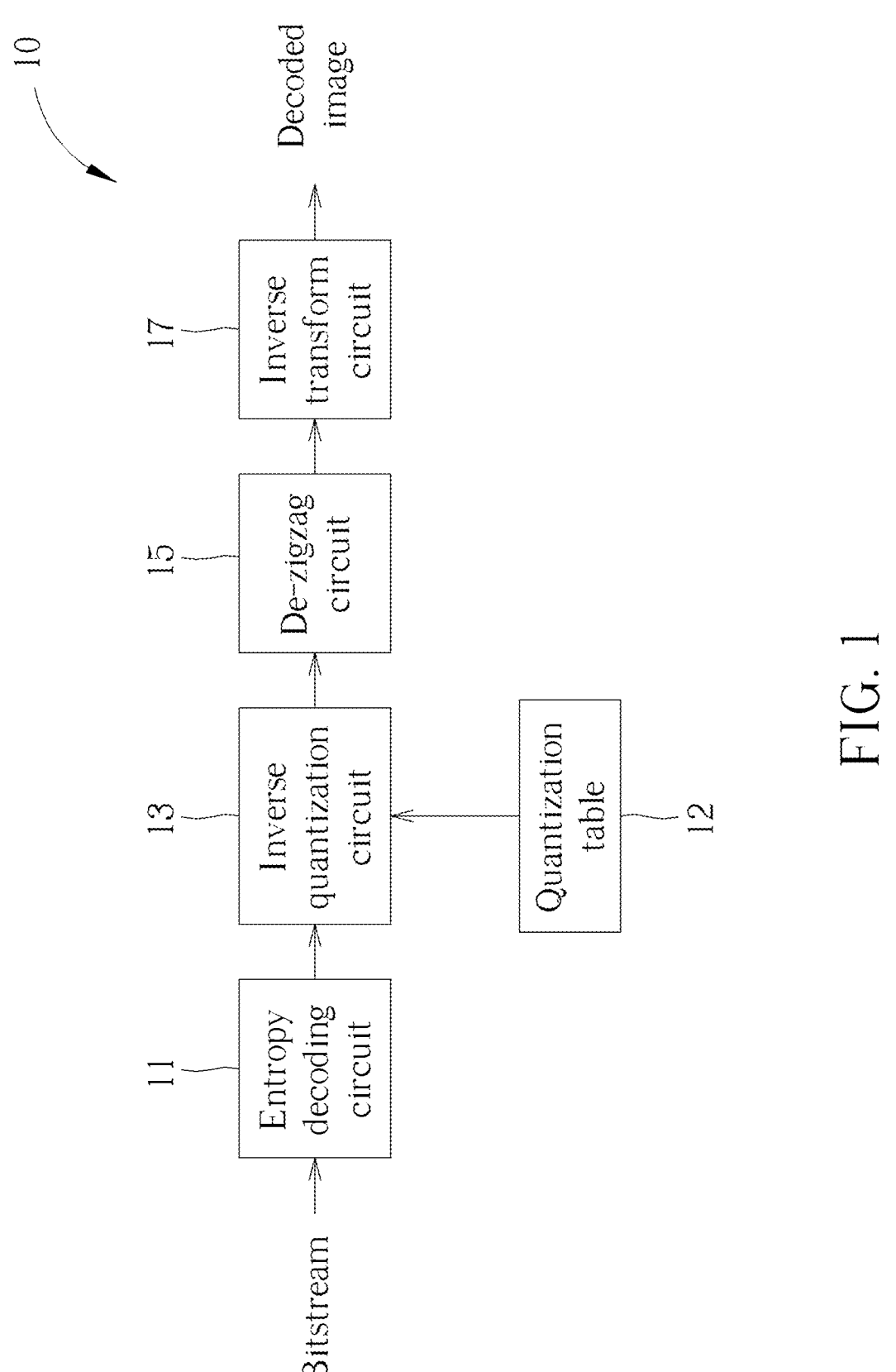
FIG. 1 is a diagram of an image decoder in the related art.
Figure 6:
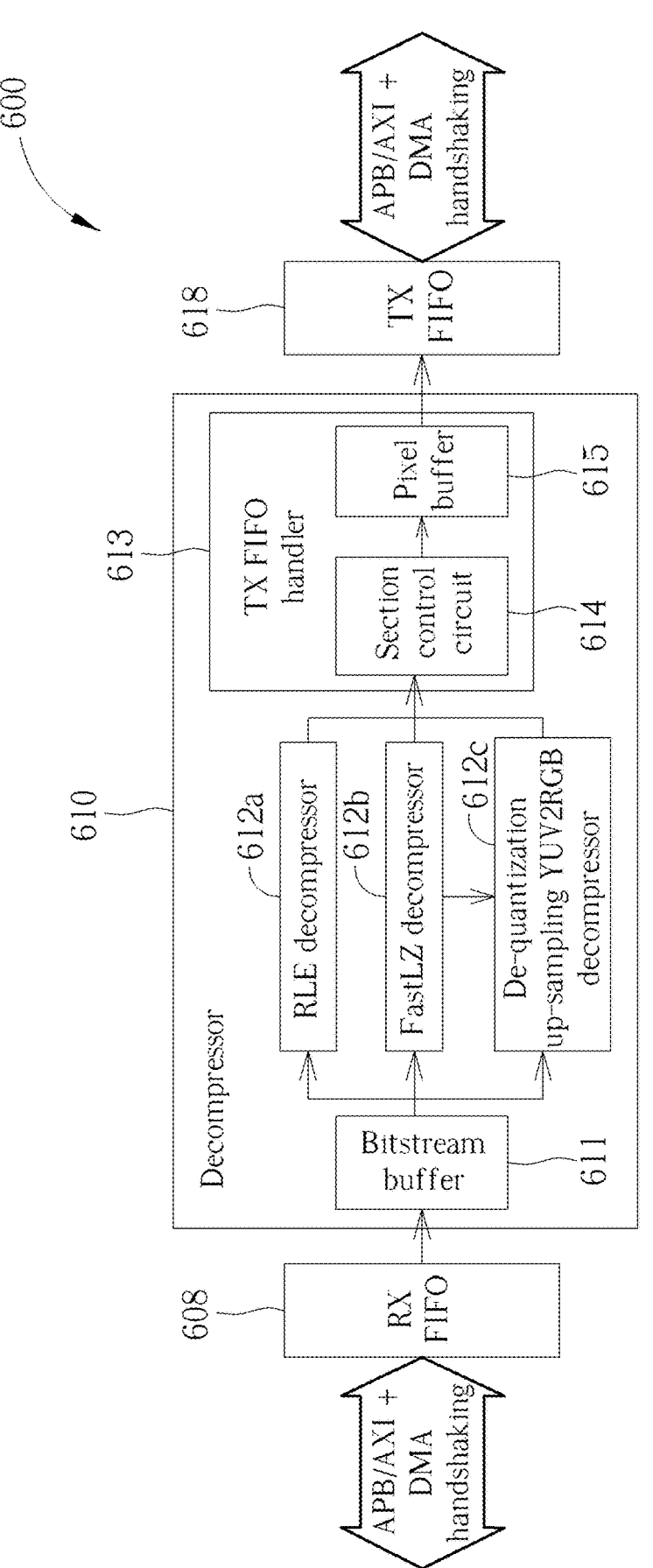
FIG. 6 is a diagram of an image processing circuit according to another embodiment of the present invention.

FIG. 6 is a diagram of an image processing circuit 600 according to another embodiment of the present invention. The image processing circuit 600 can be taken as an example of the image processing circuit 100. The image processing circuit 600 may comprise a receiving (RX) first in first out (FIFO) buffer 608 (labeled "RX FIFO" for brevity), a decompressor 610 and a transmitting (TX) FIFO buffer 618 (labeled "TX FIFO" for brevity). In particular, the decompressor 610 may comprise a bitstream buffer 611, multiple decompressors {612} such as the decompressors {612a, 612b, 612c} as well as a TX FIFO handler 613, and the TX FIFO handler 613 may comprise a section control circuit 614 and a pixel buffer 615, where the inverse quantization circuit 113 and the YUV up-sampling circuit 114 shown in FIG. 1 may be located in the decompressor 612c. In this embodiment, the multiple decompressors {612} such as the decompressors {612a, 612b, 612c} may be implemented as the run-length encoding (RLE) decompressor 612a, the FastLZ decompressor 612b and the de-quantization up-sampling YUV2RGB (or YUV-to-RGB) decompressor 612c, respectively. According to some embodiments, the multiple decompressors {612} such as the decompressors {612a, 612b, 612c, . . . } and/or their number may vary. In addition, the image processing circuit 600 may communicate with other components in the electronic device through a bus (e.g., the Advanced Peripheral Bus (APB) or the Advanced extensible Interface (AXI) bus) of the electronic device and signals complying with the DMA handshaking protocol (labeled "APB/AXI+DMA handshaking" for brevity).

The image processing circuit 600 can be implemented by using a pipeline hardware architecture as well as a highly practical modular architecture, and data transmission between modules in the modular architecture can be implemented by using unified handshaking interface, and therefore the following advantages can be achieved:

(1) changing the compression algorithm or expanding functions can be quickly accomplished by replacing modules without significantly modifying the architecture; and (2) there is no need to design an additional pause control circuit, and more particularly, when the direct memory access (DMA) data flow is interrupted, the image processing circuit 600 (or any module in the modular architecture) can pause the operation by itself by stopping the handshaking.

For example, the RX FIFO buffer 608 may be arranged to receive the compressed data moved in through DMA, and the bitstream buffer 611 may be arranged to buffer the bitstream carrying the compressed data, for being used by subsequent stages such as the multiple decompressor {612}, the multiple decompressors {612} such as the decompressors {612a, 612b, 612c} may be arranged to perform decompression, and the TX FIFO handler 613 may be arranged to temporarily store first decompressed data from at least one portion of decompressors {612} among the multiple decompressors {612}, and select at least one portion of data among the first decompressed data to be second decompressed data. The TX FIFO handler 613 (or the section control circuit 614 therein) may temporarily store the first decompressed data into pixel buffer 615, and control which decompressed data (e.g., a portion of decompressed data or all decompressed data) in the first decompressed data is sent/written into the TX FIFO buffer 618 to be the second decompressed data. The TX FIFO buffer 618 may be arranged to output the second decompressed data, and more particularly, move out the second decompressed data from the TX FIFO buffer 618 by utilizing DMA, where the second decompressed data may comprise the data of the decompressed image.

Figure 7:
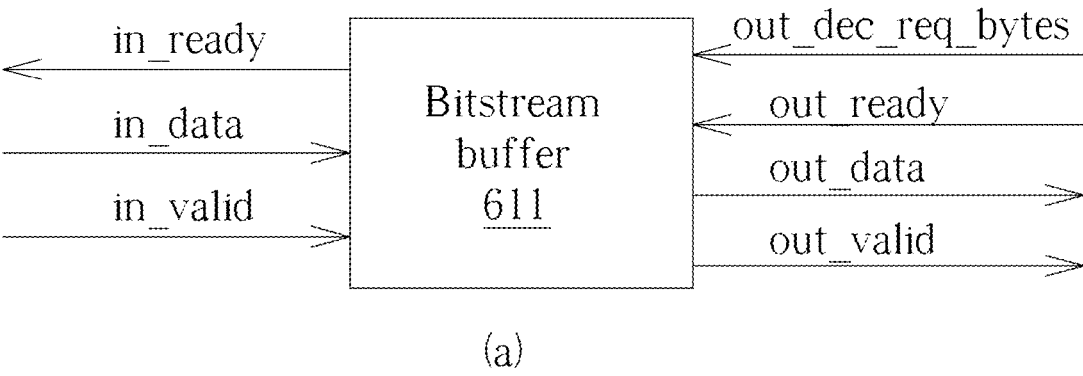
FIG. 7 illustrates some implementation details of the image processing circuit shown in FIG. 6 according to an embodiment of the present invention.
Figure 7:
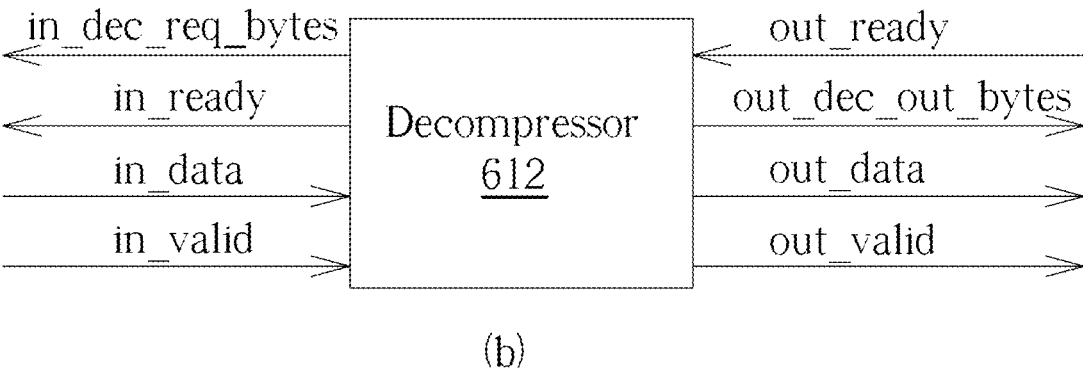
Figure 7:
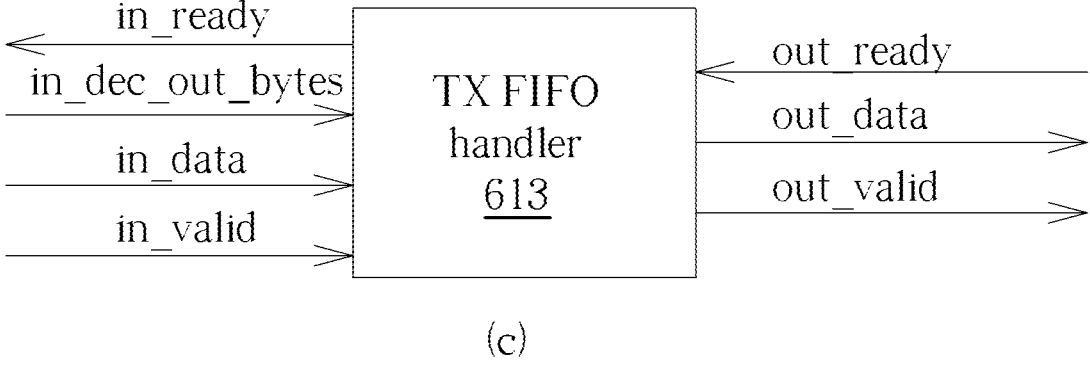

FIG. 7 illustrates some implementation details of the image processing circuit 600 shown in FIG. 6 according to an embodiment of the present invention, where the sub-diagrams (a), (b) and (c) of FIG. 7 illustrate the associated signals of the bitstream buffer 611, the decompressor 612 and the TX FIFO handler 613, respectively, and the decompressor 612 may represent any decompressor 612 among the multiple decompressors {612} (e.g., the RLE decompressor 612a, FastLZ decompressor 612b and the de-quantization up-sampling YUV2RGB decompressor 612c shown in FIG. 6). The decompressor 612 may use multiple handshaking signals to perform handshaking with the previous stage and the subsequent stage, respectively, where the multiple handshaking signals may comprise multiple first handshaking signals corresponding to the previous stage and multiple second handshaking signals corresponding to the subsequent stage as shown in the sub-diagram (b) to allow a pipeline architecture of the image processing circuit 600 to operate correctly. The image processing circuit 600 may be arranged to selectively enable at least one decompressor 612 among the multiple decompressors {612} for performing image decompression. More particularly, in the pipeline architecture, the bitstream buffer 611 and the TX FIFO handler 613 are located before and after the aforementioned at least one decompressor 612, respectively, the RX FIFO buffer 608 is located before the bitstream buffer 611, and the TX FIFO buffer 618 is located after the TX FIFO handler 613. Similarly, the bitstream buffer 611 may have its own first and second handshaking signals respectively corresponding to its own previous stage (e.g., the RX FIFO buffer 608) and subsequent stage (e.g., the decompressor 612) as shown in the sub-diagram (a) for performing handshaking with these previous/subsequent stages in the pipeline architecture, respectively, and the TX FIFO handler 613 may have its own first and second handshaking signals respectively corresponding to its own previous stage (e.g., the decompressor 612) and subsequent stage (e.g., the TX FIFO buffer 618) as shown in the sub-diagram (c) for performing handshaking with these previous/subsequent stages in the pipeline architecture, respectively.

As shown in the sub-diagram (a), regarding the bitstream buffer 611, the first handshaking signals thereof may comprise the signals {in_ready, in_data, in_valid}, and the second handshaking signals thereof may comprise the signals {out_dec_req_bytes, out_ready, out_data, out_valid}. As shown in the sub-diagram (b), regarding the aforementioned any decompressor 612, the multiple first handshaking signals may comprise the signals {in_dec_req_bytes, in_ready, in_data, in_valid}, and the multiple second handshaking signals may comprise the signals {out_ready, out_dec_out_bytes, out_data, out_valid}. As shown in the sub-diagram (c), regarding the TX FIFO handler 613, the first handshaking signals thereof may comprise the signals {in_ready, in_dec_out_bytes, in_data, in_valid}, and the second handshaking signals thereof may comprise the signals {out_ready, out_data, out_valid}. For example, in the pipeline architecture, the bitstream buffer 611 and the TX FIFO handler 613 may be located on the left-hand side and the right-hand side of the decompressor 612, respectively.

For two adjacent stages of circuits, the meaning of these signals may be described as follows:

(1) the valid signals (such as in_valid and out_valid), arranged to indicate whether the previous stage has valid data for use by the subsequent stage;

(2) the ready signals (such as in_ready and out_ready), arranged to indicate whether the subsequent stage can receive the data transmitted by the previous stage;

(3) the data signals (such as in_data and out_data), arranged to carry data transmitted from the previous stage to the subsequent stage;

(4) the dec_req_bytes signals (such as in_dec_req_bytes and out_dec_req_bytes), arranged to indicate how much valid data the subsequent stage wants the previous stage to provide, for example, determined by the decompressor 612 according to different compression algorithms; and (5) the dec_out_bytes signals (such as in_dec_out_bytes and out_dec_out_bytes), arranged to indicate how much data the previous stage decompression circuit currently decodes to the subsequent stage, for example, determined by the decompressor 612 according to different compression algorithms;

where between the two adjacent stages of circuits, if valid=1 & ready=1, which means that a set of valid data is transmitted from the previous stage to the subsequent stage, then the two adjacent stages of circuits may automatically perform the data transmission of the valid data from the previous stage to the subsequent stage; otherwise (e.g., valid=0 or ready=0), the two adjacent stages of circuits may automatically pause the operation.

The main purpose of additionally designing the bitstream buffer 611 and not allowing the decompressor 612 to obtain data directly from the RX FIFO buffer 608 in the present invention can be described as follows. In a situation where the bitstreams required by different algorithms are not of fixed length, using a RX FIFO buffer with a fixed data width in the previous stage will make the design become complicated. Therefore, the bitstream buffer 611 is designed in the present invention for buffering to guarantee that the decompressor 612 can retrieve the data within the time of one clock (or clock cycle). In addition, the main purpose of additionally designing the TX FIFO handler 613 and not allowing the decompressor 612 to directly write data into the TX FIFO buffer 618 in the present invention can be described as follows. In a situation where the decompressed data decompressed by the decompressor 612 is not of a fixed length, using a TX FIFO buffer with a fixed data width in the subsequent stage will make the design become complicated. Therefore, the TX FIFO handler 613 is designed in the present invention for buffering to guarantee that the decompressor 612 can write the data within the time of one clock (or clock cycle).

Figure 8:
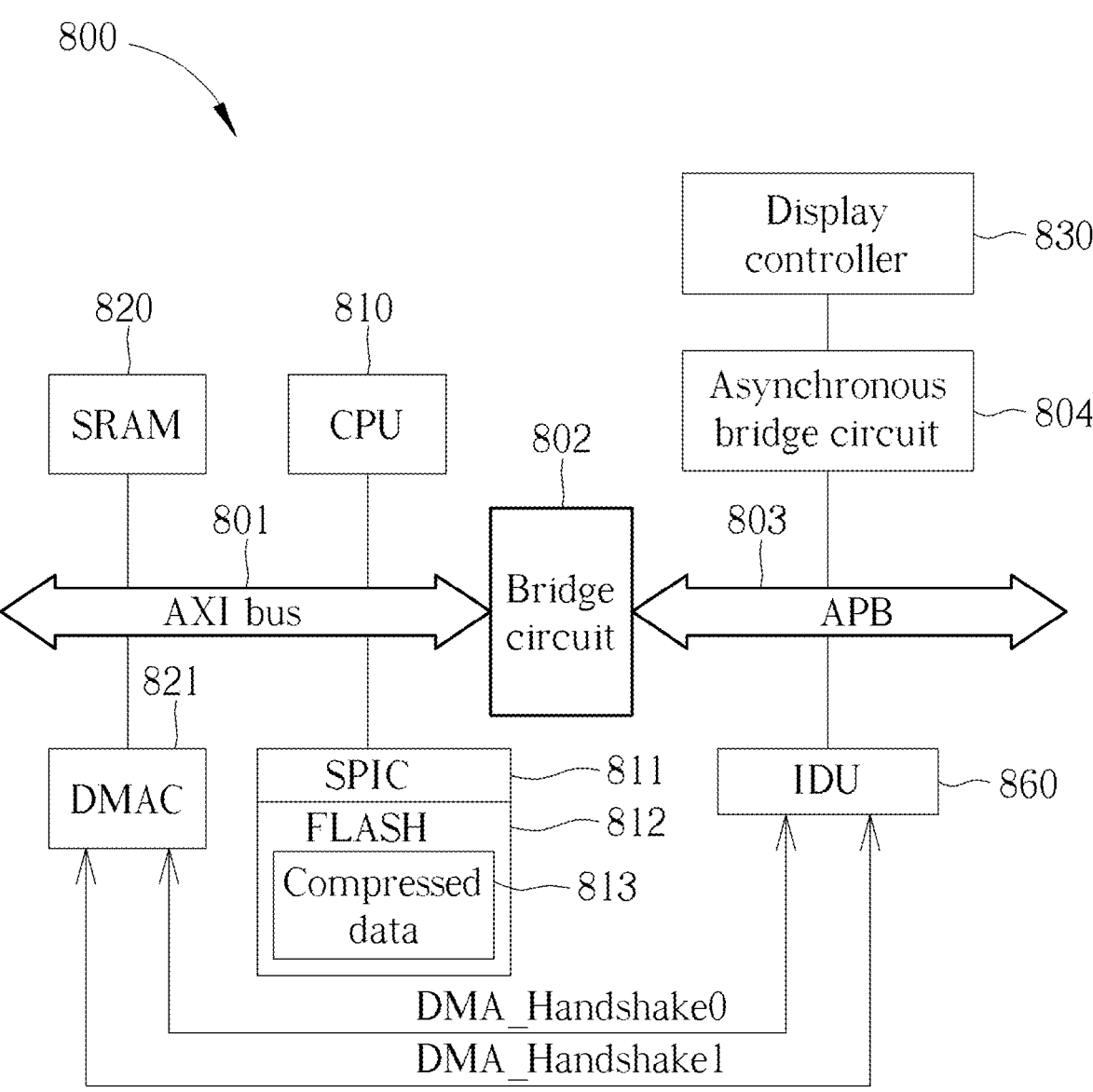
FIG. 8 is a diagram of an electronic device according to an embodiment of the present invention.

FIG. 8 is a diagram of an electronic device 800 according to an embodiment of the present invention. The image processing circuit 600 shown in FIG. 6 can be installed in the above-mentioned electronic device such as the electronic device 800. More particularly, only two sets of DMA handshaking interfaces and one set of Advanced Microcontroller Bus Architecture (AMBA) APB or AXI interfaces are needed for integrating the image processing circuit 600 into the electronic device 800 to be an image decompression unit (IDU) 860, where the architecture shown in FIG. 8 may be illustrated taking the APB interface as an example. The electronic device 800 may comprise an AXI bus 801, a bridge circuit 802, an APB 803, an asynchronous bridge circuit 804, a processing circuit (or processor) such as a central processing unit (CPU) 810, a serial peripheral interface controller (SPIC) 811, a flash memory 812 (labeled "FLASH" for brevity), a static random access memory (SRAM) 820, a DMA circuit (DMAC) 821 and a display controller 830. The IDU 860 may be coupled to the APB 803, and may communicate with the DMAC 821 through the signals {DMA_Handshake0, DMA_Handshake1} that comply with the DMA handshaking protocol. The processing circuit such as the CPU 810 may be arranged to control the operation of the electronic device 800, and the storage device such as the flash memory 812 may be arranged to store information (which may comprise the compressed data such as the compressed data 813) for the electronic device 800. The CPU 810 may send commands to the IDU 860 and/or set the control register(s) in the IDU 860, to utilize the IDU 860 to perform associated operations. When there is a need, the CPU 810 may control the IDU 860 to perform image decompression, and may select:

(1) using single or multiple compression algorithms;

(2) using distortion-free or distortion compression algorithms, or both; and (3) when selecting to use the distortion algorithm, setting any distortion level among different distortion levels.

Figure 9:
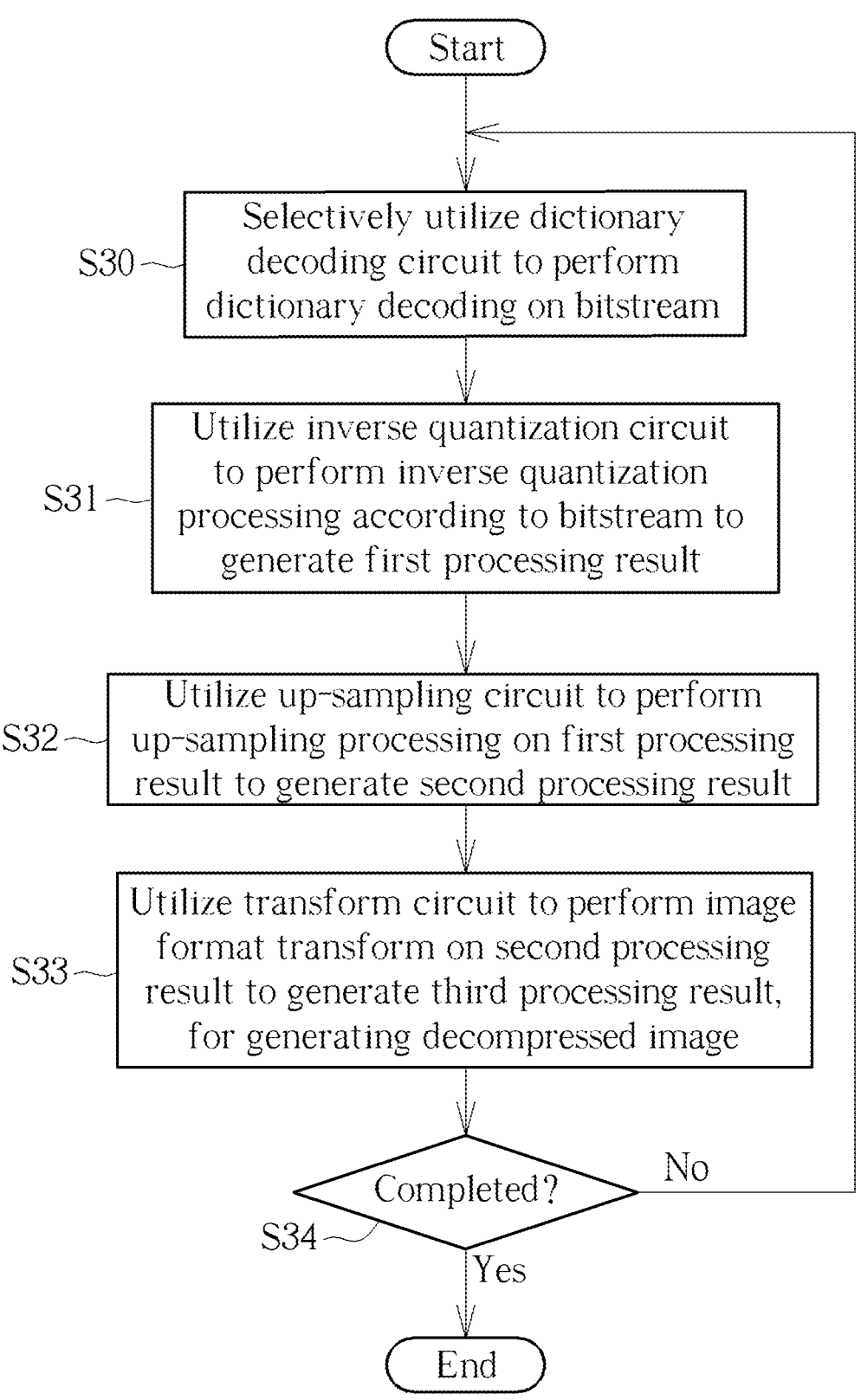
FIG. 9 illustrates a flowchart of the method according to an embodiment of the present invention.

FIG. 9 illustrates a flowchart of the method according to an embodiment of the present invention. The electronic device may utilize the image processing circuit 100 to execute the working flow shown in FIG. 9.

In Step S30, the electronic device may selectively utilize the dictionary decoding circuit 108 within the image processing circuit 100 to perform the dictionary decoding on the bitstream to generate the preliminary processing result.

In Step S31, the electronic device may utilize the inverse quantization circuit 113 within the image processing circuit 100 to perform the inverse quantization processing according to the bitstream to generate the first processing result.

In Step S32, the electronic device may utilize the up-sampling circuit 114 (e.g., the YUV up-sampling circuit 114) within the image processing circuit 100 to perform the up-sampling processing on the first processing result to generate the second processing result.

In Step S33, the electronic device may utilize the transform circuit 116 (e.g., the YUV-to-RGB transform circuit 116) within the image processing circuit 100 to perform the image format transform on the second processing result to generate the third processing result, for generating the decompressed image.

In Step S34, the electronic device may utilize the image processing circuit 100 to check whether the processing of all data is completed. If Yes, the working flow shown in FIG. 9 comes to the end; if No, Step S30 is entered to continue processing the next set of data.

The method may be illustrated with the working flow shown in FIG. 9. According to some embodiments, one or more steps may be added, deleted, or changed in the working flow shown in FIG. 9. Taking the image processing circuit 600 as an example of the image processing circuit 100, the dictionary decoding circuit 108 may be implemented as the FastLZ decompressor 612b, and the de-quantization up-sampling YUV2RGB decompressor 612c may comprise the inverse quantization circuit 113, the up-sampling circuit 114 (e.g., the YUV up-sampling circuit 114) and the transform circuit 116 (e.g., the YUV-to-RGB transform circuit 116), and more particularly, comprise the corresponding circuit architecture shown in FIG. 1, excluding the dictionary decoding circuit 108.

As shown in the above embodiments, through proper design, the method, the image processing circuit 100 (e.g., the image processing circuit 600) and the electronic device 800 of the present invention can operate normally in a situation where the aforementioned any entropy decoding circuit such as the entropy decoding circuit 11, the aforementioned any quantization table such as the quantization table 12, the aforementioned any de-zigzag circuit such as the de-zigzag circuit 15 and the aforementioned any inverse transform circuit such as the inverse transform circuit 17 do not exist, and the compression/decompression can work very well, especially for icons. For example, under an economical budget, products operating according to the method of the present invention can achieve optimized performance. In addition, when implementing according to the present invention, the associated costs are low, the compression algorithm is simple, there is no usage restriction, and there is no dependency between data, so it is very suitable for using multiple pieces of hardware for parallel processing to achieve the purpose of acceleration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing circuit, for performing image decompression with limited hardware resource, the image processing circuit comprising:

a receiving (RX) first in first out (FIFO) buffer, arranged to receive compressed data of a predetermined image;

a bitstream buffer, coupled to the RX FIFO buffer, arranged to buffer a bitstream carrying the compressed data;

multiple decompressors, coupled to the bitstream buffer, arranged to perform decompression, wherein a first decompressor among the multiple decompressors comprises:

an inverse quantization circuit, arranged to perform inverse quantization processing according to the bitstream to generate a first processing result; and an up-sampling circuit, coupled to the inverse quantization circuit, arranged to perform up-sampling processing on the first processing result to generate a second processing result, for generating a decompressed image as a reproduced version of the predetermined image;

wherein during generating the decompressed image according to the bitstream, the image processing circuit is arranged to prevent using any entropy decoding circuit, any quantization table, any de-zigzag circuit, and any inverse transform circuit associated with said any entropy decoding circuit, said any quantization table and said any de-zigzag circuit;

a transmitting (TX) FIFO buffer, arranged to output data of the decompressed image; and a TX FIFO handler, coupled between the multiple decompressors and the TX FIFO buffer, arranged to temporarily store first decompressed data from at least one portion of decompressors among the multiple decompressors, and control which decompressed data in the first decompressed data is sent into the TX FIFO buffer to be second decompressed data;

wherein the TX FIFO buffer is arranged to output the second decompressed data, wherein the second decompressed data comprises the data of the decompressed image;

wherein any decompressor among the multiple decompressors is arranged to use multiple handshaking signals to perform handshaking with a previous stage and a subsequent stage, respectively, wherein the multiple handshaking signals comprise multiple first handshaking signals corresponding to the previous stage and multiple second handshaking signals corresponding to the subsequent stage to allow a pipeline architecture of the image processing circuit to operate correctly; and the image processing circuit is arranged to selectively enable at least one decompressor among the multiple decompressors for performing image decompression, wherein in the pipeline architecture, the bitstream buffer and the TX FIFO handler are located before and after the at least one decompressor, respectively, the RX FIFO buffer is located before the bitstream buffer, and the TX FIFO buffer is located after the TX FIFO handler.

2. The image processing circuit of claim 1, wherein in the image processing circuit, said any entropy decoding circuit, said any quantization table, said any de-zigzag circuit and said any inverse transform circuit do not exist.

3. The image processing circuit of claim 1, further comprising:

a transform circuit, coupled to the up-sampling circuit, arranged to perform image format transform on the second processing result to generate a third processing result for generating the decompressed image.

4. The image processing circuit of claim 1, further comprising:

a dictionary decoding circuit, coupled to the inverse quantization circuit, arranged to perform dictionary decoding on the bitstream to generate a preliminary processing result;

wherein the inverse quantization circuit is arranged to perform the inverse quantization processing on the preliminary processing result to generate the first processing result.

5. The image processing circuit of claim 1, wherein the predetermined image represents a predetermined icon image.

6. The image processing circuit of claim 1, wherein performing the inverse quantization processing comprises performing de-quantization on multiple sets of quantized down-sampled luminance and chrominance data to generate multiple sets of down-sampled luminance and chrominance data, wherein the first processing result comprises the multiple sets of down-sampled luminance and chrominance data corresponding to the multiple sets of quantized down-sampled luminance and chrominance data, and the second processing result comprises multiple sets of luminance and chrominance data corresponding to the multiple sets of down-sampled luminance and chrominance data.

7. An electronic device comprising the image processing circuit of claim 1, wherein the electronic device further comprises:

a processing circuit, arranged to control operations of the electronic device; and a storage device, coupled to the processing circuit, arranged to store information for the electronic device, wherein the information comprises the compressed data;

wherein the processing circuit is arranged to generate the decompressed image according to the bitstream, for being displayed on a display of the electronic device.

8. A method for performing image decompression with limited hardware resource, the method being applicable to an image processing circuit, the method comprising:

utilizing a receiving (RX) first in first out (FIFO) buffer within the image processing circuit to receive compressed data of a predetermined image;

utilizing a bitstream buffer within the image processing circuit to buffer a bitstream carrying the compressed data;

utilizing a first decompressor among multiple decompressors within the image processing circuit to perform decompression, wherein utilizing the first decompressor among the multiple decompressors within the image processing circuit to perform the decompression comprises:

utilizing an inverse quantization circuit within the first decompressor to perform inverse quantization processing according to the bitstream to generate a first processing result; and utilizing an up-sampling circuit within the first decompressor to perform up-sampling processing on the first processing result to generate a second processing result, for generating a decompressed image as a reproduced version of the predetermined image;

wherein during generating the decompressed image according to the bitstream, the image processing circuit is arranged to prevent using any entropy decoding circuit, any quantization table, any de-zigzag circuit, and any inverse transform circuit associated with said any entropy decoding circuit, said any quantization table and said any de-zigzag circuit;

utilizing a transmitting (TX) FIFO buffer within the image processing circuit to output data of the decompressed image; and utilizing a TX FIFO handler within the image processing circuit to temporarily store first decompressed data from at least one portion of decompressors among the multiple decompressors, and control which decompressed data in the first decompressed data is sent into the TX FIFO buffer to be second decompressed data;

wherein the TX FIFO buffer is arranged to output the second decompressed data, wherein the second decompressed data comprises the data of the decompressed image;

wherein any decompressor among the multiple decompressors is arranged to use multiple handshaking signals to perform handshaking with a previous stage and a subsequent stage, respectively, wherein the multiple handshaking signals comprise multiple first handshaking signals corresponding to the previous stage and multiple second handshaking signals corresponding to the subsequent stage to allow a pipeline architecture of the image processing circuit to operate correctly; and the image processing circuit is arranged to selectively enable at least one decompressor among the multiple decompressors for performing image decompression, wherein in the pipeline architecture, the bitstream buffer and the TX FIFO handler are located before and after the at least one decompressor, respectively, the RX FIFO buffer is located before the bitstream buffer, and the TX FIFO buffer is located after the TX FIFO handler.

\* \* \* \* \*